United States Patent Office 2,763,653
Patented Sept. 18, 1956

2,763,653

CHEMICAL COMPOUND

Jacob Szmuszkovicz, Portage Township, Kalamazoo County, Mich., assignor to The Upjohn Company, Kalamazoo, Mich., a corporation of Michigan No Drawing. Application April 11, 1955, Serial No. 500,701

1 Claim. (Cl. 260—287)

The present invention is concerned with physiologically active chemical compounds related to reserpine and is more particularly concerned with methyl reserpate O-(β-cyclopentylpropionate) represented by the following formula, the β-cyclopentylpropionate radical being underlined:

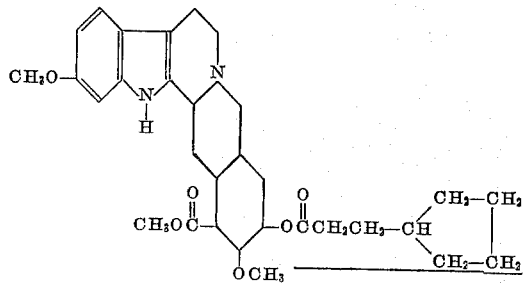

It is an object of the present invention to provide methyl reserpate O-(β-cyclopentylpropionate) which is a physiologically active agent of high potency having hypotensive and sedative properties and which has a superior ratio of hypotensive to sedative activity and a superior therapeutic ratio when compared with reserpine. The compound of the present invention can be substituted for reserpine in known reserpine-containing pharmaceutical compositions such as tablets, injectables and elixirs. Other objects and uses of the present invention will be apparent to one skilled in the art.

The methyl reserpate O-(β-cyclopentylpropionate) of the present invention is obtained by esterification of methyl reserpate to introduce the β-cyclopentylpropionate radical, as more fully illustrated by the example below.

The starting methyl reserpate is prepared by methanolysis of reserpine with sodium methoxide according to the procedure of Dorfmann et al. recorded in Helv. Chim. Acta, 37, 59 (1954). Within the meaning of the term "methyl reserpate O-(β-cyclopentylpropionate)" and the scope of this invention is included the free base, acid addition salts such as the sulfates, hydrochloride, phosphates, hydrobromide, acetate, propionate, benzoate, maleates, succinates, phenylacetate, β-cyclopentylpropionate, etc., and quaternary ammonium salts obtained by reaction of the free base with organic halides such as methyl iodide, ethyl bromide, benzyl chloride, etc.

The following example is illustrative only and is not to be construed as limiting the scope of the present invention.

Example

A solution of one gram of methyl reserpate in fifteen milliliters of pyridine was cooled in an ice-bath, 0.78 gram of β-cyclopentylpropionyl chloride was added dropwise with stirring, and the resulting mixture maintained at room temperature for nineteen hours. Ice and water then were added and the diluted aqueous mixture extracted four times with chloroform. The combined chloroform extracts were washed twice with 30-milliliter portions of 3% aqueous potassium hydroxide solution, the combined aqueous potassium hydroxide wash solutions extracted once with chloroform, and the resulting combined chloroform extracts washed with saturated aqueous sodium chloride solution twice, and then dried over anhydrous sodium sulfate. Evaporation of the solvent gave a residue which, on trituration with ether, gave 1.02 grams of brown product. On crystallization of the brown product from a benzene-ether mixture, 0.79 gram of methyl reserpate O-(β-cyclopentylpropionate) was obtained; melting point under vacuum 245–247 degrees centigrade. Two recrystallizations from methanol gave short needles, melting point under vacuum 246–247.5 degrees centigrade.

Analysis.—Calculated for $C_{31}H_{42}N_2O_6$: C, 69.12; H, 7.86; N, 5.20. Found: C, 69.10; H, 7.62; N, 5.61.

I claim:

Methyl reserpate O-(β-cyclopentylpropionate).

No references cited.